No. 748,802. Patented January 5, 1904.

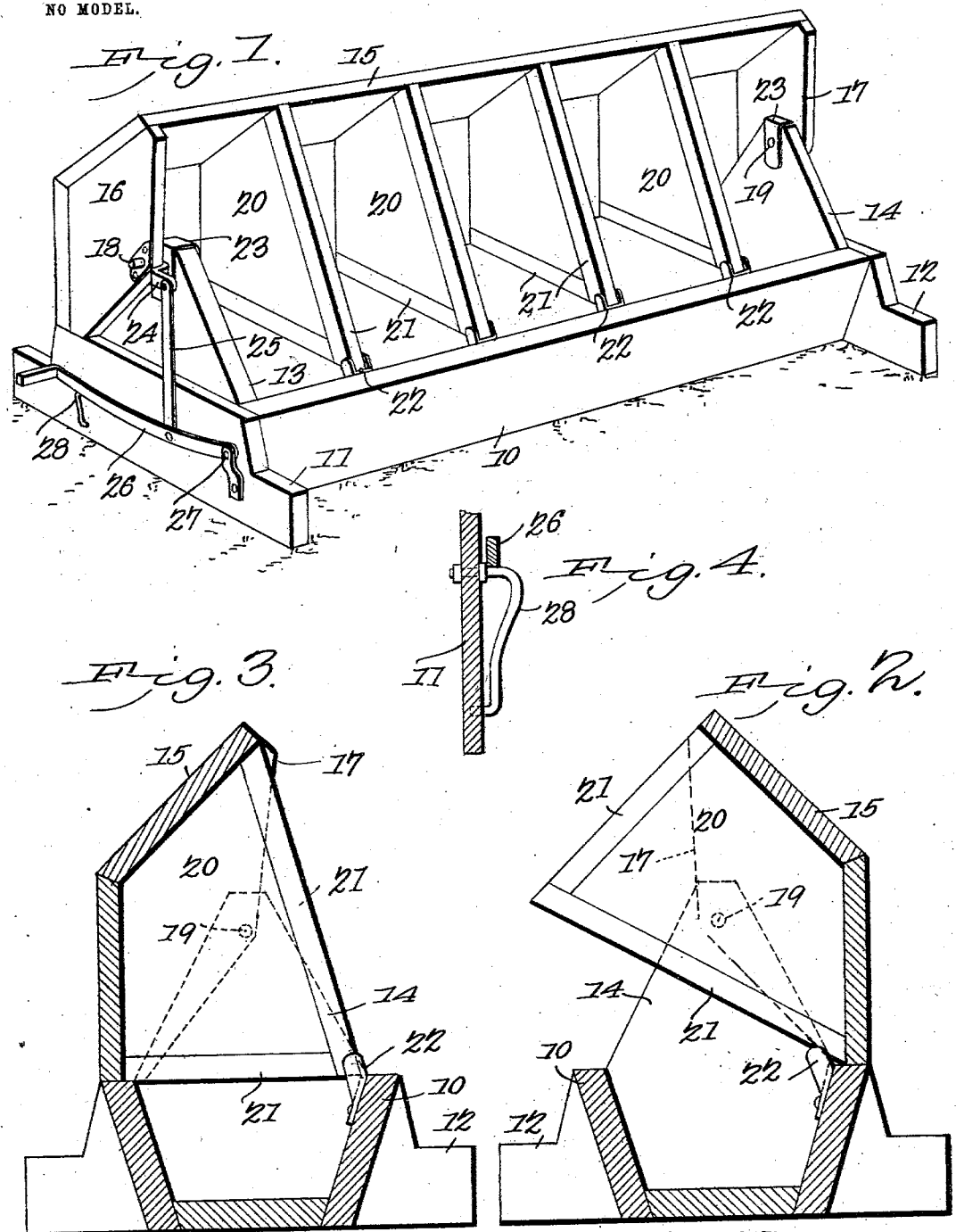

UNITED STATES PATENT OFFICE.

JAMES J. SMITH, OF ENID, OKLAHOMA TERRITORY.

FEED-TROUGH.

SPECIFICATION forming part of Letters Patent No. 748,802, dated January 5, 1904.

Application filed September 28, 1903. Serial No. 174,970. (No model.)

*To all whom it may concern:*

Be it known that I, JAMES J. SMITH, a citizen of the United States, residing at Enid, in the county of Garfield and Territory of Oklahoma, have invented a new and useful Feed-Trough, of which the following is a specification.

This invention relates to feed-troughs, and has for its object to improve the construction of such devices, to promote cleanliness and secure better sanitation by providing means for protecting the food while being consumed and from contamination by the animals, to enable the smaller animals to feed without interference from the larger ones, to prevent the animals feeding until the proper time or until the feed is properly placed in the trough, to protect the person of the attendant from the feed, and other objects which will be hereinafter disclosed.

The invention consists in certain novel features of construction, as hereinafter shown and described, and specified in the claims.

Figure 1 is a perspective view of a feed-trough constructed in accordance with this invention viewed from the "feed" side. Fig. 2 is a transverse elevation with the shield in one of its two positions, and Fig. 3 shows the shield in its reversed position. Fig. 4 is a detail view illustrating the arrangement of the shield-locking mechanism.

The trough is represented at 10 and may be of any capacity or length and constructed of any suitable material, but will generally be of wood, and will preferably be erected in an opening in a fence, one of the side walls of a pen, yard, or other inclosure, so that access may be had to it from one side without entering the inclosure.
The trough is formed with transverse end supports 11 12 and vertical end extensions 13 14, as shown.

Above the trough a shield 15 is movably supported, the shield being of flattened V shape in transverse section, with end sections 16 17, pivoted, as at 18 19, to the vertical extensions 13 14, as shown. The shield is thus mounted to swing laterally above the trough, and the relative parts will be so proportioned that when the shield is in one of its positions, as in Fig. 2, one edge will engage the trough at one side and extend vertically therefrom, and when the position is reversed the other edge of the shield will engage the other edge of the trough and extend vertically therefrom, as in Fig. 3. Disposed transversely of the interior of the shield are a plurality of division-plates 20, so formed that their extremities extend to the opposite side of the trough when the shield is placed in one of its two positions and are elevated above the trough when the position of the shield is reversed, as shown, respectively, in Figs. 2 and 3. By this simple arrangement when the shield is "open," as in Fig. 2, or arranged to shut off the feed side the division-plates are elevated and do not interfere with the introduction of the feed into the trough, and when the position of the shield is reversed to open the feed side, as in Figs. 1 and 3, the plates extend transversely of the trough and divide it into compartments to provide for the different animals and effectually prevent them from interfering with each other and likewise preventing the larger animals crowding the smaller ones from the trough. The edges of the plates 20 are provided with detachable "binding-strips" 21, which may be renewed when worn or broken, and thus avoid the expense of an entire new set of division-plates, as the edges are the only portions which usually sustain the strains.

Attached to the feeding side of the trough are spaced sockets 22 to engage the corners of the division-plates and prevent lateral movement thereto. The sockets are of sheet metal bent into the required shape, with spaced sides embracing the sides of the division-plates, as shown. By this simple arrangement the plates are supported and displacement effectually prevented when lateral pressure is exerted upon them by the animals while feeding.

The upper ends of the extensions 13 are provided with U-shaped plates 23, extending upon each side of the extensions and forming guard-plates for the pivot-bolts 18 19, which pass through the end sections 16 17 of the shield, and are further supported by exterior guard-plates.

Bolted or otherwise secured to the end section 16 is an arm 24, extending centrally from the section and connected by a rod 25 to a foot-lever 26, the latter pivoted at 27 to the trough end and extending over an inclined guard 28 near the free end. By this arrangement it will be obvious that by depressing the foot-lever the shield may be thrown from side to side. It will be noted that if the foot-lever be suddenly depressed the shield will be thrown over past the center of gravity and fall into its opposite position, when the foot-lever is released and permitted to rise again to its former position. The lever-arm is held from lateral movement by the securing means 27, so that the lever-arm will be held closely against the end 11 of the trough and rest upon the outwardly-extending upper end of the staple 28 when in its upward position, as in Figs. 1 and 4, requiring force to move it out of engagement with said staple. By this means it will be obvious that when the lever is in this position the shield will be firmly locked in either one of its two positions, so that the animals cannot move the shield to close it when open, as in Figs. 1 and 3, or to displace it and pass to the trough when closed, as in Fig. 2. The trough is thus efficiently protected when not in use or when being supplied with feed, and the opening which would otherwise be formed by the removal or displacement of the shield when in use is prevented with equal efficiency.

It will thus be seen that the feeding device is simple, inexpensive in construction, adapted for all the uses for which feed-troughs are generally employed, and will save time and labor, and will effectually prevent waste or the interference of the stronger animals with the weaker ones.

Having thus described the invention, what I claim is—

1. In a device of the class described, a feed-trough, and a shield mounted to swing laterally above said trough and alternately engage its opposite sides, said shield provided with spaced transverse division-plates for engagement with one side of the trough when the shield is disposed in one of its two positions and disengaged therefrom when the position of the shield is reversed, substantially as described.

2. In a device of the class described, a feed-trough having upwardly-extended ends, and a shield pivotally connected to said extended ends and swinging laterally over said trough and alternately engaging its opposite sides, said shield provided with spaced transverse division-plates for engagement with one side of the trough when the shield is disposed in one of its two positions and disengaged therefrom when the position of the shield is reversed, substantially as described.

3. In a device of the class described, a feed-trough, a shield mounted to swing laterally above said trough and alternately engage its opposite sides, said shield provided with spaced transverse division-plates for engagement with one side of the trough when the shield is disposed in one of its two positions and disengaged therefrom when the position of the shield is reversed, and socket-plates carried by said trough for the reception of said division-plates and preventing lateral movement thereof, substantially as described.

4. A device of the class described, comprising a trough and a shield of approximately V shape in transverse section and having sides at angles to each other, said shield being pivotally mounted above the trough and arranged to swing laterally of the same and extending vertically of the side of the trough at which it is arranged and provided with spaced transverse division-plates for engagement with said trough when the shield is disposed in one of its two positions and disengaged therefrom when the position of the shield is reversed, substantially as described.

5. In a device of the class described, a feed-trough, a shield mounted to swing laterally above said trough and alternately engage its opposite sides, said shield provided with spaced transverse division-plates for engagement with one side of the trough when the shield is disposed in one of its two positions and disengaged therefrom when the position of the shield is reversed, and sockets formed of sheet-steel bent with parallel sides and attached to said trough for the reception of said division-plates, substantially as described.

6. In a device of the class described, a trough, a pivotally-mounted shield swinging laterally above the trough and having an arm extending therefrom, a foot-lever connected by a rod to said arm, and a guard extending into the path of said foot-lever for sustaining it in its upward position, and locking the shield both in its open and closed positions, substantially as described.

In testimony that I claim the foregoing as my own I have hereto affixed my signature in the presence of two witnesses.

JAMES J. SMITH.

Witnesses:
NEWTON BURWELL,
BEULAH GOODHUE.